United States Patent
Nguyen

[19]

[11] Patent Number: 5,982,146
[45] Date of Patent: Nov. 9, 1999

[54] METHOD AND APPARATUS FOR CONDITIONING BATTERY WHILE EXTERNAL POWER IS APPLIED

[75] Inventor: Don J. Nguyen, Portland, Oreg.

[73] Assignee: Intel Corporation, Santa Clara, Calif.

[21] Appl. No.: 09/080,008

[22] Filed: May 15, 1998

[51] Int. Cl.$^6$ .................................................. H02J 7/00
[52] U.S. Cl. .......................................... 320/131; 320/132
[58] Field of Search .................................... 320/127, 131, 320/132, DIG. 11; 307/66, 85, 86, 87

[56] References Cited

U.S. PATENT DOCUMENTS

| | | | |
|---|---|---|---|
| 3,997,830 | 12/1976 | Newell et al. | 320/131 |
| 4,558,270 | 12/1985 | Liautaud et al. | 320/131 |
| 4,734,635 | 3/1988 | Theobald | 320/131 |
| 5,712,795 | 1/1998 | Layman et al. | 320/131 |

OTHER PUBLICATIONS

Access.bus, *Industry Group,Smart Battery System Device Protocol Specification*, p. 16, Jan. 1995.

Durcell/Intel, *Smart Battery Data Specification*, p. 42, Feb. 15, 1995.

*Primary Examiner*—Peter S. Wong
*Assistant Examiner*—K. Shin
*Attorney, Agent, or Firm*—Jeffrey S. Draeger

[57] ABSTRACT

A method which may be used to condition a battery. The method includes sensing that the battery needs to be conditioned while an external power source is being used as the source of system power. According to the method, the battery is then used as the system power source while the external power source remains available.

22 Claims, 3 Drawing Sheets

METHOD AND APPARATUS FOR CONDITIONING BATTERY WHILE EXTERNAL POWER IS APPLIED

BACKGROUND OF THE INVENTION

1. Field of the Invention

The present invention pertains to the field of portable computing devices. More particularly, the present invention pertains to conditioning a battery in a computing device while external power is applied.

2. Description of Related Art

Conditioning a battery typically prolongs the life of the battery and may also allow a battery charge sensor to calibrate itself. The first step of conditioning a battery is ensuring that the battery discharges completely or at least discharges to a certain level. Such discharging should be followed by charging until the battery is fully charged, or at least close to fully charged. Conditioning avoids cycling the battery only through a small charge-discharge range and reduces the likelihood that the battery will be limited in charge range by its "memory" of previous cycles.

Even though some batteries purportedly do not have this "memory" effect, conditioning may still be important. A "smart" battery designed for use with a computer system may include a sensor circuit to determine battery information, such as the amount of remaining charge. After many charge and discharge cycles, the battery sensor may lose its calibration and need to be calibrated again. Calibration may be accomplished by conditioning the battery. In other words, calibration may be accomplished by discharging the battery to a first (e.g., minimum) known level and then recharging the battery to a second (e.g., maximum) known level.

Unfortunately, prior art portable computing devices do not automatically condition batteries. Battery conditioning involves discharging the battery, and prior art devices do not discharge the battery when external power (e.g., direct current power from an A/C adapter plug or an alternate external direct current source) is applied. In fact, prior art devices often charge the battery any time that external power is applied and the battery is less than fully charged.

Consequently, to discharge the battery, the user of a prior art portable computing device may need to operate the device without external power until the battery is discharged. Alternatively, the user could simply leave the system inactive, presumably eventually discharging the battery. Both of these methods may be inconvenient to users since users may not be able to schedule computer use to accommodate battery charging and discharging.

Thus, with prior art systems, conditioning batteries requires user intervention. Such user intervention is inconvenient and reduces the likelihood that users will condition their batteries regularly to preserve battery charge range and allow accurate battery readings. Consequently, the prior art does not provide an adequate solution which automatically conditions batteries.

SUMMARY

A method which may be used to condition a battery is disclosed. The method includes sensing that the battery needs to be conditioned while an external power source is being used as the source of system power. According to the method, the battery is then used as the system power source while the external power source remains available.

BRIEF DESCRIPTION OF THE FIGURES

The present invention is illustrated by way of example and not limitation in the figures of the accompanying drawings.

DETAILED DESCRIPTION

The following description provides a method and apparatus for conditioning a battery while external power is applied. In the following description, numerous specific details such as bus protocols, battery types, voltage levels, and logic partitioning choices are set forth in order to provide a more thorough understanding of the present invention. It will be appreciated, however, by one skilled in the art that the invention may be practiced without such specific details. In other instances, control structures and gate level circuits have not been shown in detail in order not to obscure the invention. Those of ordinary skill in the art, with the included descriptions, will be able to implement the necessary logic circuits without undue experimentation.

The disclosed method and apparatus allow conditioning of a battery while external power remains available. Accordingly, a system utilizing the disclosed techniques may allow battery conditioning without requiring a user to physically disconnect external power. Such automatic conditioning may advantageously prolong battery life and/or may allow calibration of a battery sensor.

Figure 1:
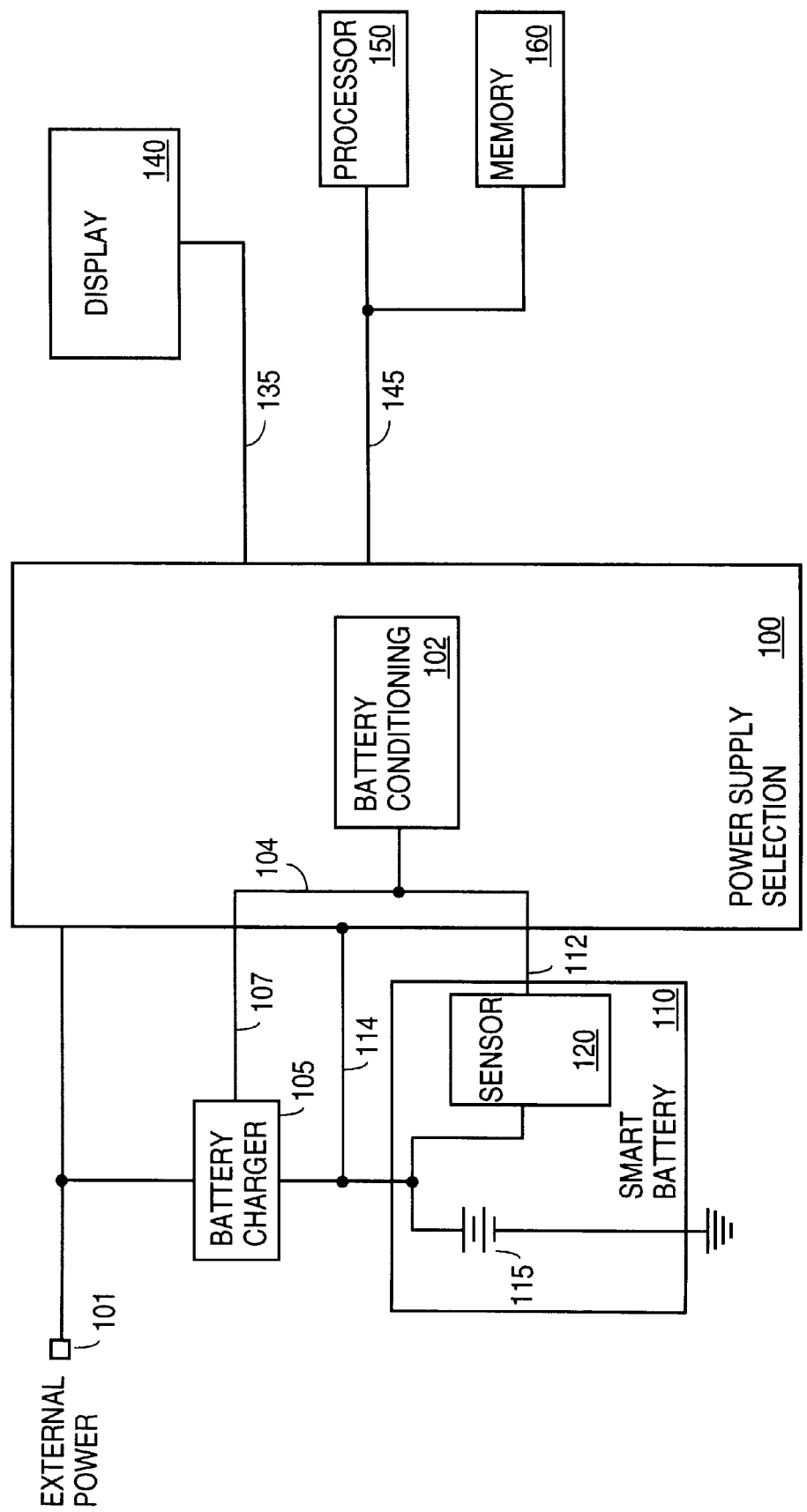
FIG. 1 illustrates one embodiment of a system which conditions a battery while external power is applied.

FIG. 1 illustrates one embodiment of a computer system which can condition a battery while external power remains available. Typically, a portable computing device may need to condition one or more batteries; however, any computing device having a battery which may need conditioning may utilize a disclosed technique. The components in the system of FIG. 1 include a display 140, a processor 150, and a memory 160. Additionally, numerous other devices such as input/output and communications devices may be present.

The various components present in the system may be powered by a battery or an external power supply. In the illustrated embodiment, external power is supplied via an external power input 101, and battery power is supplied on a battery supply line 114 by a smart battery 110. A power supply selection unit 100 determines whether to power the system components (e.g., the display 140, the processor 150, and the memory 160) using the smart battery 110 or the external power input 101. The power supply selection unit 100 and other units described herein may be implemented using dedicated hardware, or may utilize software, or a combination of hardware and software.

The power supply selection unit 100 may include or be used in conjunction with power conversion circuitry to transform and/or otherwise regulate the voltages supplied to the system components. In the illustrated embodiment, a first voltage supply line 135 delivers a first voltage to the display 140, and a second voltage supply line 145 delivers a second voltage to the processor 150 and the memory 160. The arrangement of voltages supplied and the particular system components receiving these voltages is not, however, crucial to the present invention.

The smart battery 110 includes battery cells 115 and a sensor 120. The sensor 120 is capable of determining when the battery cells 115 are in need of conditioning and signaling this need to a battery conditioning unit 102 via a signal line 112. The battery conditioning unit 102 is part of the power supply selection unit 100. In general, when external power is available, the power supply selection unit 100 utilizes the external power to supply power to the system components. When the external power is not available, the power supply selection unit 100 selects the smart battery 110 to supply the power to the system components.

When the smart battery 110 signals the need for conditioning to the battery conditioning unit 102, however, the battery conditioning unit 102 causes the power supply selection unit 100 to select the smart battery 110 despite external power still being available. Using the smart battery 110 to power the system causes the smart battery 110 to drain without having to physically disconnect the external power supply.

After the smart battery 110 discharges to a predetermined level (as detected by the sensor 120), the power supply selection unit 100 reverts to external power. The smart battery 110 may at this point calibrate itself. The battery conditioning unit 102 then enables a battery charger 105 via a signal line 107, and the battery charger 105 charges the battery cells 115. Notably, the signal lines 107 and 112 may be a part of a single bus 104 as shown or may be separate signal lines. Typically, the battery cells 115 are charged to a maximum level such that the battery cells 115 have undergone a full discharge-charge cycle and so that the smart battery 110 is calibrated and reset to indicate that it is fully charged.

Figure 2:
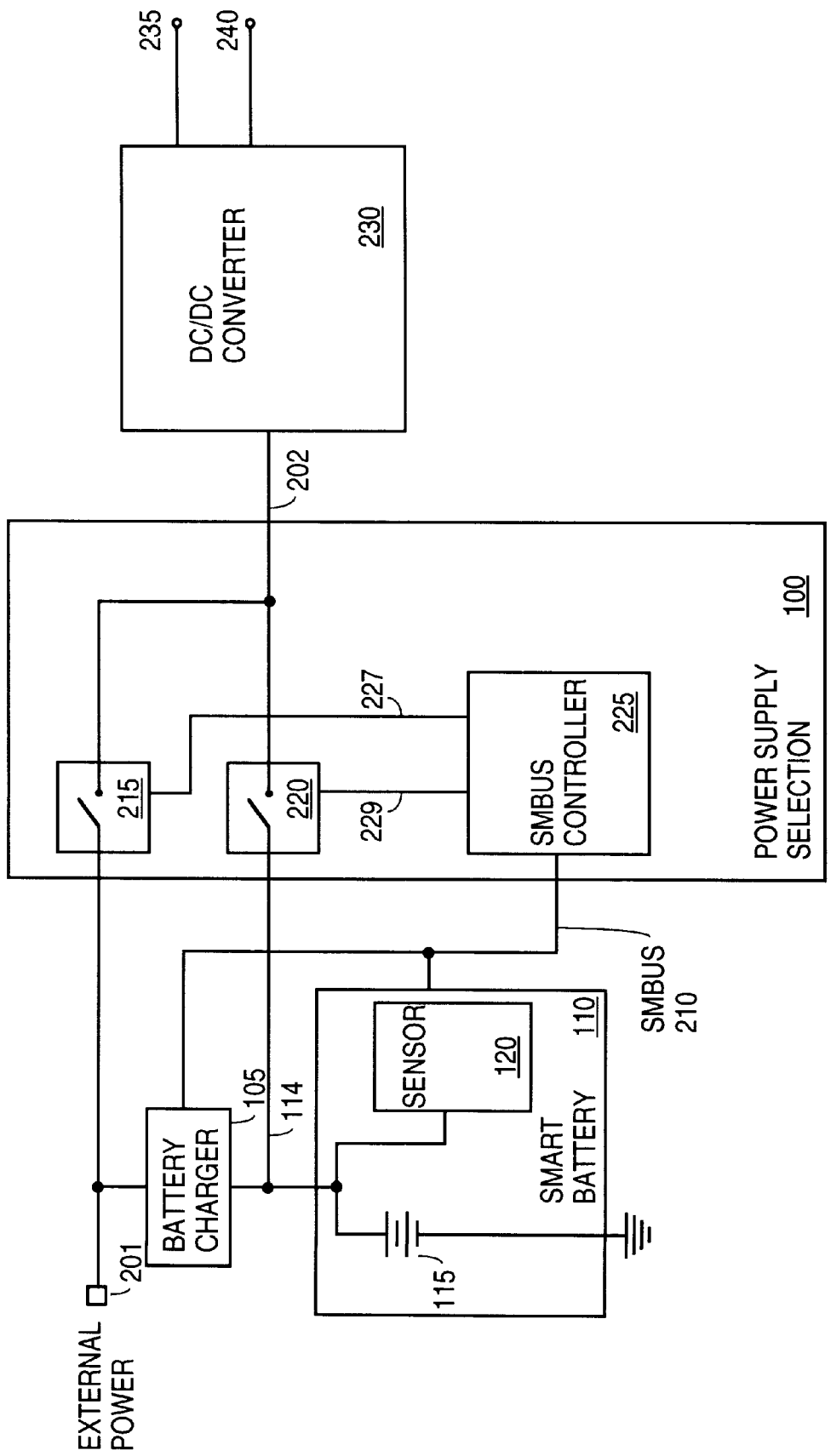
FIG. 2 illustrates further details of one embodiment of a system which conditions a battery while external power is applied.

Among other things, further details of the power supply selection unit 100 of one embodiment are illustrated in FIG. 2. As also shown, the power supply selection unit 100 may be used in conjunction with a power conversion circuit, such as a direct current (DC) to DC converter 230. The converter 230 produces first and second voltages on voltage supply lines 235 and 240 for use by various system components.

In the embodiment of FIG. 2, a system management bus (SMBus) controller 225 is connected to a SMBus 210 for communication with the smart battery 110 and the battery charger 105. In this embodiment, the SMBus controller 225, the battery charger 105, and the smart battery 110 communicate over the SMBus 210 using a serial signaling convention described in the SMBus Specification, Revision 1.0, Feb. 15, 1995, which is available through Intel Corporation of Santa Clara, Calif. or, as of the filing of this application, from the Smart Battery Implementer's Forum on the Internet at www.sbs-forum.org.

Figure 3:
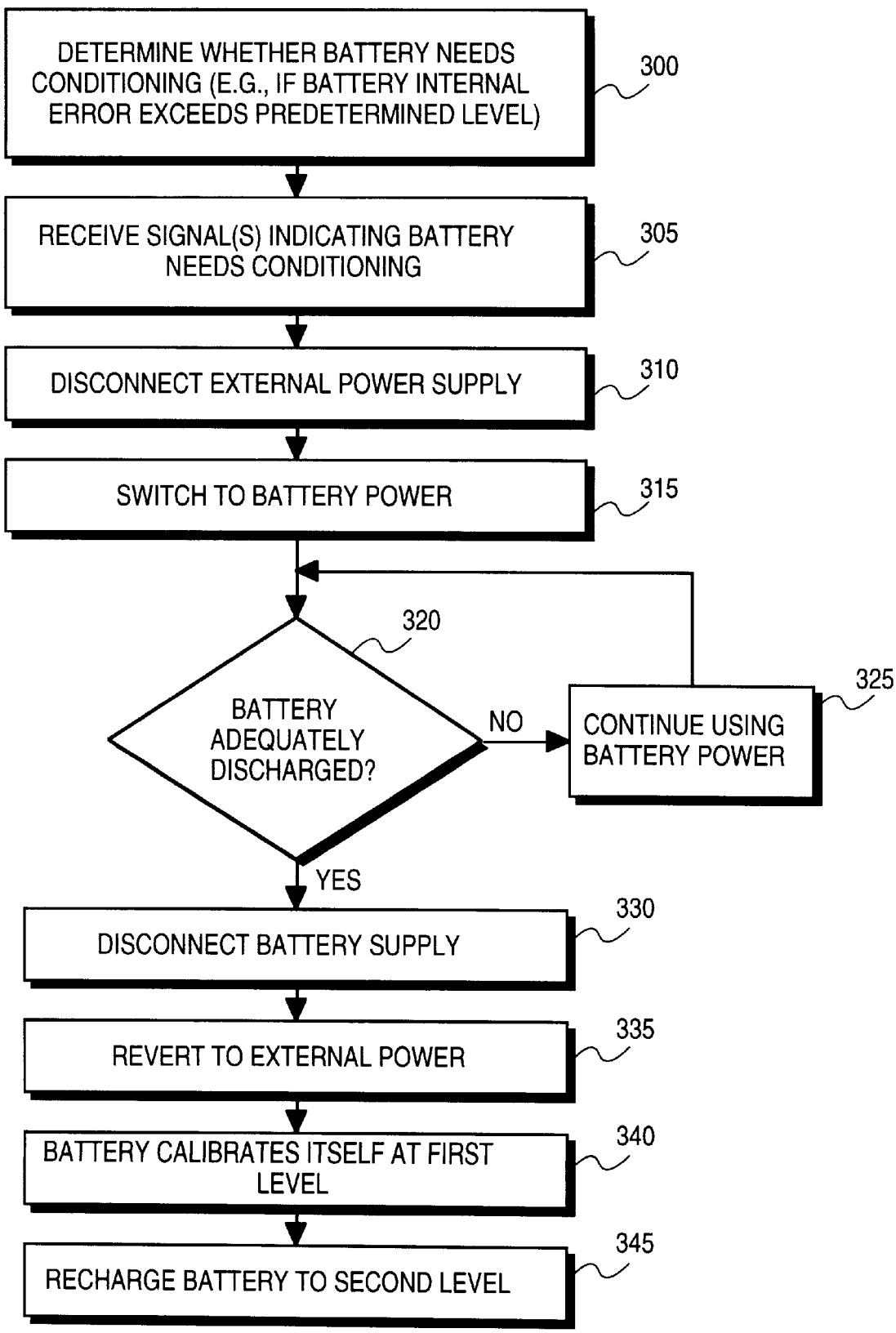
FIG. 3 illustrates a flowchart of the sequence of events occuring in one embodiment of a system which conditions a battery while external power is applied.

The operation of the embodiment illustrated in FIG. 2 may be understood with reference to the flowchart in FIG. 3. As indicated in block 300, the smart battery 110 may determine that it needs to be conditioned by analyzing an internal error level. The error level indicates an estimate of the inaccuracy in the charge readings developed by the sensor. Generally, the error increases with the number of charge-discharge cycles that occur. Thus, the error may be a count of charge-discharge cycles or any other mechanism which can indicate when the battery needs to be conditioned. When the internal error exceeds a predetermined level, the smart battery 110 signals that conditioning is necessary. Alternatively, the number of times the computer system is disconnected from the external power source and/or the amount of time of disconnected operation may be tracked to guage the battery's need for conditioning.

As illustrated in block 305, the SMBus controller 225 receives signals over the SMBus 210 indicating that the battery needs conditioning. In alternative embodiments, signaling may be performed in other manners which communicate the message that the battery needs conditioning. Additionally, the logic detecting that the battery cells 115 need to be conditioned may be separate from the battery cells 115 (e.g., integrated into the power supply selection unit 100).

Once the SMBus controller 225 receives the signal indicating that conditioning is needed, the external power (e.g., DC power from an A/C adapter) that is received at an A/C adapter power input 201 is disconnected as illustrated in block 305. To do so, the SMBus controller 225 generates a signal on signal line 227 to open an electronically controlled switch 215. This disconnects the external power from the power supply selection unit output 202.

As illustrated in block 315, the SMBus controller 225 then switches to battery power by sending a signal on a signal line 229 to close a second electronically controlled switch 220. This connects the battery supply line 114 to the power supply selection unit output 202. By disconnecting the A/C power supply before connecting the battery to the power supply selection unit output 202, contention between these two supplies may be avoided. The switches 215 and 220 are controlled by the SMBus controller 225 to interrupt power to the converter 230 for a period short enough to allow the converter 230 to maintain its outputs. In other words, the switch 220 is closed very shortly after the switch 215 is opened to prevent the voltage on the power supply selection unit output 202 from dipping too low. The exact timing of the signals is determined by characteristics of the switches 215 and 220 and the power converter 230.

Once the power supply selection unit 100 has switched to battery power, the battery is drained due to normal operation of the system. Since the smart battery 110 can track its level of charge, the system can check if the battery has been adequately discharged as indicated in block 320. For the purpose of conditioning, it may be desirable to discharge the battery to a minimum voltage level such that the zero point of the battery may be calibrated. For example, the minimum voltage level (the discharge trip point) may be nine tenths of a volt per cell in a nickel metal hydride (NiMH) battery and two and one-half volts per cell in a Lithium-Ion (Li-Ion) battery. The system may determine the type of battery being used through SMBus commands.

If the battery has not bee n adequately discharged, the battery continues to be used as indicated in block 325. If the battery has been adequately discharged, the SMBus controller 225 then disconnects the battery supply by opening the electronically controlled switch 220 as shown in block 330. Next the SMBus controller 225 reverts to A/C power as indicated in block 335 by closing the electronically controlled switch 215.

Since the battery has been discharged to a predetermined (first) level, the battery calibrates itself as indicated in block 340. The SMBus controller then enables the battery charger 105 via a command sent over the SMBus 210. The battery charger 105 recharges the smart battery 110 as shown in block 345. The battery is recharged until a second level (e.g., a maximum charge level) is reached. For example, the second level (the charge trip point) may be volts per cell for a NiMH battery and four and two tenths volt for a Li-Ion battery. The smart battery 110 may perform additional calibration activities when charged to this second level. After this process is complete, the recharged and calibrated smart battery has been automatically conditioned without user intervention.

Thus, a method and apparatus for conditioning a battery while external power is applied is disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. A method comprising:

determining that a battery needs to be conditioned while an external power source is being used as a system power source; and switching to use the battery as the system power source while the external power source remains available upon determining that an error indicator for the battery exceeds a predetermined level.

2. The method of claim 1 further comprising:

discharging the battery.

3. The method of claim 2 wherein discharging the battery further comprises discharging the battery until a predetermined battery level is reached.

4. The method of claim 1 wherein determining that the battery needs to be conditioned comprises receiving a signal indicating that the battery needs to be conditioned.

5. The method of claim 1 wherein switching to use the battery further comprises: disconnecting the external power source from a plurality of components; and connecting the battery to the plurality of components.

6. The method of claim 3, after discharging, further comprising:

reverting to the external power source.

7. The method of claim 6 further comprising:

calibrating the battery.

8. The method of claim 7 further comprising:

recharging the battery.

9. The method of claim 4 wherein the signal is a serial format signal transmitted via a shared bus.

10. A method of conditioning a battery in a portable computing device when external power is being applied to the portable computing device, comprising:

determining that the battery needs to be reconditioned by testing whether a battery sensor indicator exceeds a predetermined level;

switching to battery power while the external power is still being applied to the portable computing device; and discharging the battery to a predetermined level.

11. The method of claim 10 further comprising:

switching back to external power; and recharging the battery.

12. A power supply selection circuit comprising:

a signal input for receiving a battery conditioning request from a sensor for a battery; and control circuitry coupled to receive the battery conditioning request from the signal input and to switch from an external power supply to the battery while the external power supply is still connected to the power supply selection circuit upon receipt of the battery conditioning request.

13. The power supply selection circuit of claim 12 wherein the control circuitry comprises:

a bus controller which receives the battery conditioning request on at least one signal line;

a first electrically controlled switch coupling the external power supply to a power converter circuit, the first electrically controlled switch being coupled to receive a first control signal from the control circuitry; and a second electrically controlled switch coupling the battery to the power converter circuit, the second electrically controlled switch being coupled to receive a second control signal from the control circuitry.

14. The power supply selection circuit of claim 12 wherein the control circuitry is further coupled to switch from the battery to the external power supply when a predetermined battery level has been reached.

15. The power supply selection circuit of claim 14 wherein the control circuitry is further coupled to enable a battery charger after switching from the battery to the external power supply.

16. A system comprising:

a battery;

a plurality of components coupled to receive power from the battery or an external source;

a power supply selection unit coupled to detect a first condition of the battery, the first condition being an indication signaled by the battery that the battery is in need of conditioning, the power supply selection unit also being coupled to disconnect the plurality of components from the external source while the external source is still available to the power supply selection circuit and to connect the plurality of components to the battery.

17. The system of claim 16 wherein the first condition is an internal counter exceeding a predetermined level.

18. The system of claim 16 wherein the power supply selection unit also disconnects the battery and reconnects the external source when a predetermined battery level is reached.

19. The system of claim 18 wherein the computer system further comprises a battery charger and wherein the power supply selection unit further activates the battery charger to charge the battery when the predetermined battery level is reached.

20. The system of claim 19 wherein the power supply selection unit comprises:

a bus controller coupled to the battery charger and the battery, the bus controller detecting the first condition of the battery when the battery sends a signal indicating the first condition, a first switch coupling the external source to the plurality of components under control of the bus controller; and a second switch coupling the battery to the plurality of components under control of the bus controller.

21. The system of claim 20 wherein the power supply selection circuit is coupled to open the first switch before closing the second switch and to open the second switch before closing the first switch.

22. The system of claim 13 wherein the control circuitry is further coupled to open the first electrically controlled switch before closing the second electrically controlled switch and to open the second electrically controlled switch before closing the first electrically controlled switch.

* * * * *